US006388867B1

(12) United States Patent
Rakus et al.

(10) Patent No.: US 6,388,867 B1
(45) Date of Patent: May 14, 2002

(54) FLEXIBLE SEAL FOR CIRCUIT BREAKER ARC GAS EXHAUST SYSTEM

(75) Inventors: Paul Richard Rakus, Beaver Falls; William John Jones, Cranberry Township; James Jeffery Benke, Pittsburgh, all of PA (US)

(73) Assignee: Eaton Corporation, Cleveland, OH (US)

( * ) Notice: Subject to any disclaimer, the term of this patent is extended or adjusted under 35 U.S.C. 154(b) by 68 days.

(21) Appl. No.: 09/675,347

(22) Filed: Sep. 29, 2000

(51) Int. Cl.$^{7}$ .................................................. H02B 5/00

(52) U.S. Cl. ........................ 361/605; 365/608; 365/611; 365/614; 218/156; 218/157; 200/306; 200/308; 335/201; 335/206

(58) Field of Search ................................ 361/605, 611, 361/614, 624, 638–639, 648–649, 650, 622–623, 659, 657, 645, 667, 673, 832, 807–810; 200/50.21, 50.23, 306, 289, 293–305, 307–308; 218/155, 158, 148, 139, 42, 15–18; 335/201–206, 167–176, 8–19, 132; 220/203.01, 203.09, 203.1

(56) References Cited

U.S. PATENT DOCUMENTS 5,878,905 A * 3/1999 Grobach et al. ....... 220/203.01
5,892,195 A * 4/1999 Aufermann et al. ........ 218/157
6,205,017 B1 * 3/2001 Wilkie et al. ............... 361/605
6,215,654 B1 * 4/2001 Wilkie et al. ............... 361/605
6,252,186 B1 * 6/2001 Liebetruth et al. ....... 200/43.01
6,288,621 B1 * 9/2001 Rival ......................... 335/201
6,326,872 B1 * 12/2001 Marchand et al. .......... 335/202

FOREIGN PATENT DOCUMENTS

DE 003536068 A1 * 4/1987 .......... H01H/09/34

* cited by examiner

*Primary Examiner*—Darren Schuberg
*Assistant Examiner*—Michael Datskovsky
(74) *Attorney, Agent, or Firm*—Martin J. Moran

(57) ABSTRACT

A seal apparatus having a seal member and a plurality of fasteners is mounted on an arc hood of a cassette in a switchgear cabinet and resists leakage of arc gases through a gap between the arc hood and a circuit breaker mounted in the switchgear cabinet. The seal member is flexibly received against the circuit breaker in a racked position and is preferably at least nominally deflected thereby to resist the flow of arc gases in a leakage direction through the gap. The seal member thus resists the arc gases from coming into contact with a plurality of line conductors at the rear of the circuit breaker until the arc gases have at least somewhat cooled, deionized, and/or slowed. The seal apparatus thereby resists arc gases from inducing arcing between adjacent line conductors, whereby the circuit breaker can be operated at substantially higher voltages.

20 Claims, 8 Drawing Sheets

FLEXIBLE SEAL FOR CIRCUIT BREAKER ARC GAS EXHAUST SYSTEM

BACKGROUND OF THE INVENTION

1. Field of the Invention

The present invention relates generally to electric power distribution systems and, more particularly, to switchgear cabinetry and circuit breakers employed in power distribution systems. Specifically, the invention relates to a sealing apparatus that seals a gap between an arc hood mounted on a switchgear cabinet and a circuit breaker removably mounted in the switchgear cabinet to resist leakage of arc gases through the gap.

2. Description of the Related Art

Switchgear for electric power distribution systems includes electrical switching apparatus and their line and load terminations together with related equipment mounted in metal cabinets. Switchgear used in sections of electric power distribution systems operating at voltages up through 690 volts is classified as low voltage switchgear (according to international standards, although the ANSI standard for low voltage is a maximum of 600 volts.) Typically, the electrical switching apparatus is a circuit breaker, but other switching apparatus such as network protectors, disconnect switches, and transfer switches are also mounted in such switchgear cabinets. Henceforth, the electrical switching apparatus will be referred to as circuit breakers, although it will be understood that other types of electrical switching apparatus can be used as well.

Typically, in such low voltage switchgear, multiple circuit breakers are mounted in each cabinet in cells stacked vertically in a forward compartment. The line and load conductors are mounted in rearward compartments and engage the circuit breakers through quick disconnects as the circuit breakers are installed in the cells.

Power circuit breakers can generate significant amounts of arc gases when interrupting large currents such as those associated with a short circuit in the distribution system. It is common for the arc gases to be vented through the top or the rear of the circuit breaker. Generally, the approach is to slow the arc gases and to cool them before they leave the switchgear cabinet.

Arc gases that result from the interruption of current typically are of an extremely high velocity and are highly ionized. If such highly ionized arc gases are permitted to flow past the line conductors of the circuit breaker, such gases can promote arcing between adjacent line conductors. It is also known that similar arcing can occur between adjacent load conductors, between an outboard line or load conductor and the switchgear cabinetry, and between the quick disconnects that are connected with the line and load conductors. Henceforth, however, for the sake of simplicity all such arcing within the terminal area will be referred to as arcing between adjacent line conductors. The potential for such arcing is dependent upon the space between the adjacent conductors, the presence or absence of high dielectric insulators between the conductors, and the voltage that is delivered to the conductors, as well as the existence of arc gases and the degree of ionization thereof.

Switchgear cabinetry is thus typically designed to include one or more channels into which arc gases can be directed for dissipation thereof. In this regard, such switchgear cabinets typically include an arc hood that is mounted within each cell and is disposed above the vents in the circuit breaker through which the arc gases are exhausted.

As is known in the relevant art, circuit breakers typically are subject to a certain amount of movement during operation thereof. Moreover, circuit breakers are often slidably mounted within the cells to permit rapid removal of the circuit breakers for maintenance and for other purposes. It is desirable, therefore, that a nominal gap exist between the arc hood mounted on the switchgear cabinet and the circuit breaker to avoid interference therebetween during operation of the circuit breaker and during installation and removal of the circuit breaker into and from the switchgear cabinet.

In some applications, however, the circuit breaker is in a fixed-mount application and thus is not slidably mounted within the switchgear cabinet. Nevertheless, many of the parts employed in such applications are the same parts employed in the slidable switchgear applications, such that a gap still exists between the circuit breaker and the arc hood in fixed-mount applications.

Such a gap undesirably permits some of the arc gases to leak therethrough. Such leaking arc gases typically flow into the terminal area in the vicinity of the line conductors and increase the likelihood of arcing therebetween. It is thus preferred to provide a device and method for resisting the leakage of arc gases through such a gap between an arc hood mounted on a switchgear cabinet and a circuit breaker mounted on the switchgear cabinet. Such a device and method preferably would improve the ratings of the circuit breaker.

SUMMARY OF THE INVENTION

This need and others are satisfied by the invention which is directed generally to a seal apparatus that spans a gap between an arc hood mounted on a switchgear cabinet and a circuit breaker moveably carried on the switchgear cabinet. The seal apparatus includes a seal member mounted on the arc hood with a plurality of fasteners. The circuit breaker is movable between a racked position within a cell of the switchgear cabinet and an unracked position external to the cell. When the circuit breaker is in the racked position, the arc hood is disposed adjacent the circuit breaker, and the seal member sealingly extends across a gap between the arc hood and the circuit breaker to resist the flow of arc gases through the gap. The seal apparatus thus resists the direct flow of arc gases into the region of the line conductors at the rear of the circuit breaker. The seal member is advantageously received against and elastically deflected by the circuit breaker in the racked position.

An objective of the present invention is to provide a power distribution system that resists arc gases from directly flowing into contact with line conductors on the circuit breakers.

Another objective of the present invention is to provide a seal apparatus that can improve the performance ratings of a power distribution system.

Another objective of the present invention is to provide a seal apparatus that resists the flow of arc gases directly toward the line conductors on the circuit breakers.

Another objective of the present invention is to provide a seal apparatus that can be retrofitted onto existing switchgear cabinetry.

Another objective of the present invention is to provide a seal apparatus that promotes the flow of arc gases in a desirable discharge direction while permitting a gap to exist between an arc hood on a switchgear cabinet and a circuit breaker within the switchgear cabinet.

Another objective of the present invention is to provide a flexible seal that permits a circuit breaker to be racked into and out of a switchgear cabinet without causing damage to or diminishing operation of the circuit breaker or the switchgear cabinet.

An aspect of the present invention thus is to provide a power distribution system, the general nature of which can be stated as including a switchgear cabinet having an arc hood, a circuit breaker movably carried on the switchgear cabinet, the circuit breaker being movable along a longitudinal axis between a racked position and an unracked position, and a seal apparatus mounted on one of the circuit breaker and the switchgear cabinet, the arc hood being disposed at least partially adjacent the circuit breaker when the circuit breaker is in the racked position, the arc hood being structured to direct arc gases in a discharge direction, the seal apparatus sealingly extending between at least a portion of the arc hood and at least a portion of the circuit breaker when the circuit breaker is in the racked position, the seal apparatus being structured to resist the flow of arc gases in a leakage direction.

Another aspect of the present invention is to provide a seal apparatus for resisting the flow of arc gases through a gap between a circuit breaker and an arc hood in a switchgear cabinet, the general nature of which can be stated as including a seal member mounted on one of the arc hood and the circuit breaker and structured to sealingly extend along at least a portion of the gap between the arc hood and the circuit breaker.

Still another aspect of the present invention is to provide a method of resisting the flow of a quantity of arc gases through a gap between an arc hood mounted on a switchgear cabinet and a circuit breaker movably mounted on the cabinet, the general nature of which can be stated as including the steps of mounting a seal apparatus on one of the switchgear cabinet and the circuit breaker and sealingly spanning the seal apparatus across at least a portion of the gap.

BRIEF DESCRIPTION OF THE DRAWINGS

The preferred embodiment of the present invention, illustrative of the best mode in which applicants have contemplated applying the principles of the invention, is set forth in the following description and is shown in the drawings and is particularly and distinctly pointed out and set forth in the appended claims.

Similar numerals refer to similar parts throughout the specification.

DESCRIPTION OF THE PREFERRED EMBODIMENT

Figure 1:
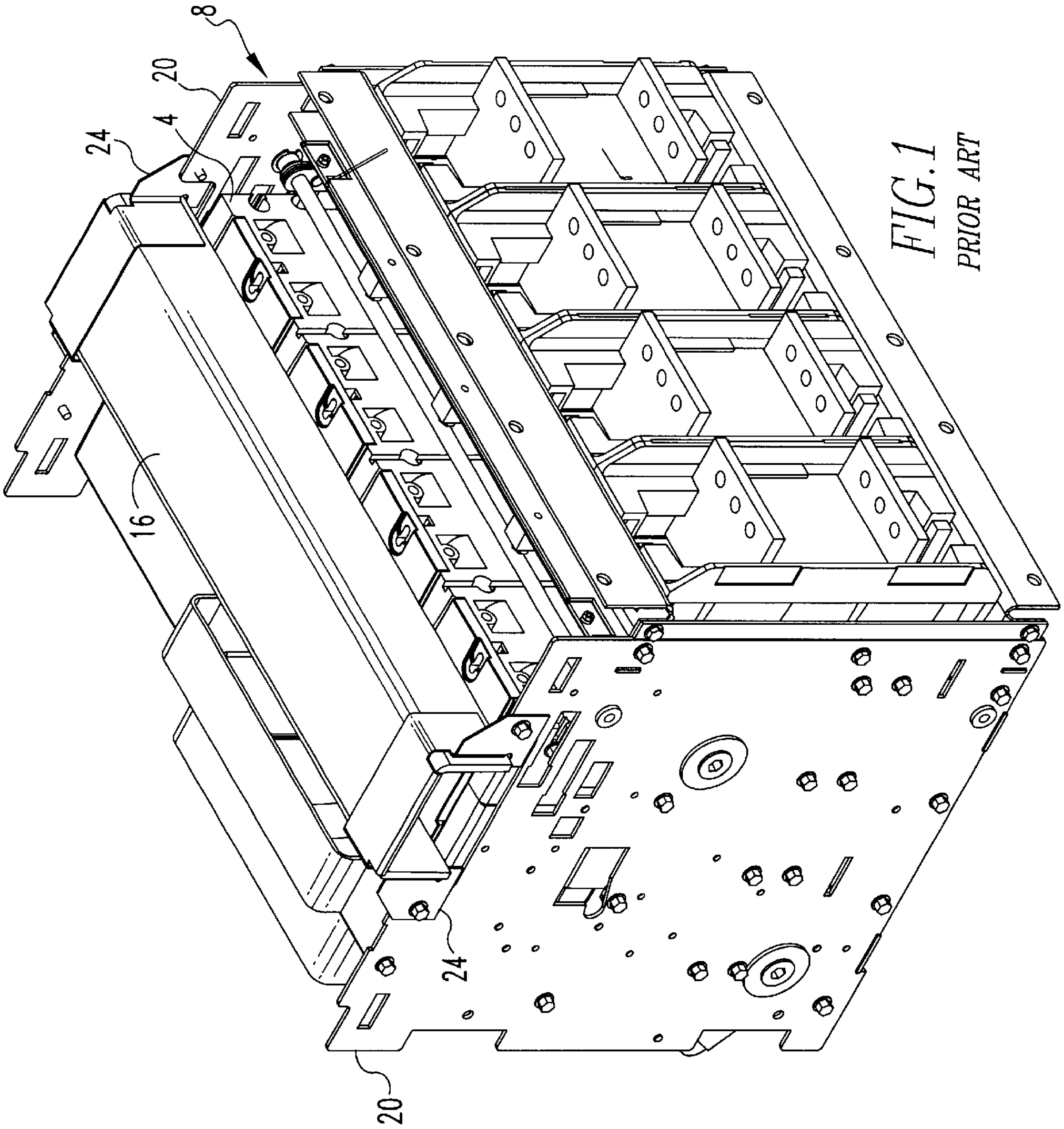
FIG. 1 PRIOR ART
FIG. 1 is a perspective view of a circuit breaker mounted in a prior art cassette that forms a part of a switchgear cabinet.

A circuit breaker 4 and a prior art cassette 8 are indicated generally in FIG. 1. A plurality of the cassettes 8 are typically disposed inside a switchgear cabinet, whereby the cassettes 8 are each a part of the switchgear cabinet. Each of the cassettes 8 typically carries a circuit breaker 4. A switchgear cabinet having at least one cassette 8 carrying at least one circuit breaker 4 provides a power distribution system that interrupts current under certain specified conditions.

As can further be seen in FIG. 1, the cassette 8 includes an arc hood 16 mounted on a pair of spaced sidewalls 20 of the cassette 8 with a pair of brackets 24. The arc hood 16 is positioned to extend over and be disposed at least partially adjacent the circuit breaker 4 when the circuit breaker 4 is in a racked position, as is indicated generally in FIG. 1. The arc hood 16 is of a generally upside-down U-shape in cross section and thus provides a flow channel 28 (FIG. 3) that is open at the opposite ends of the arc hood 16.

Figure 2:
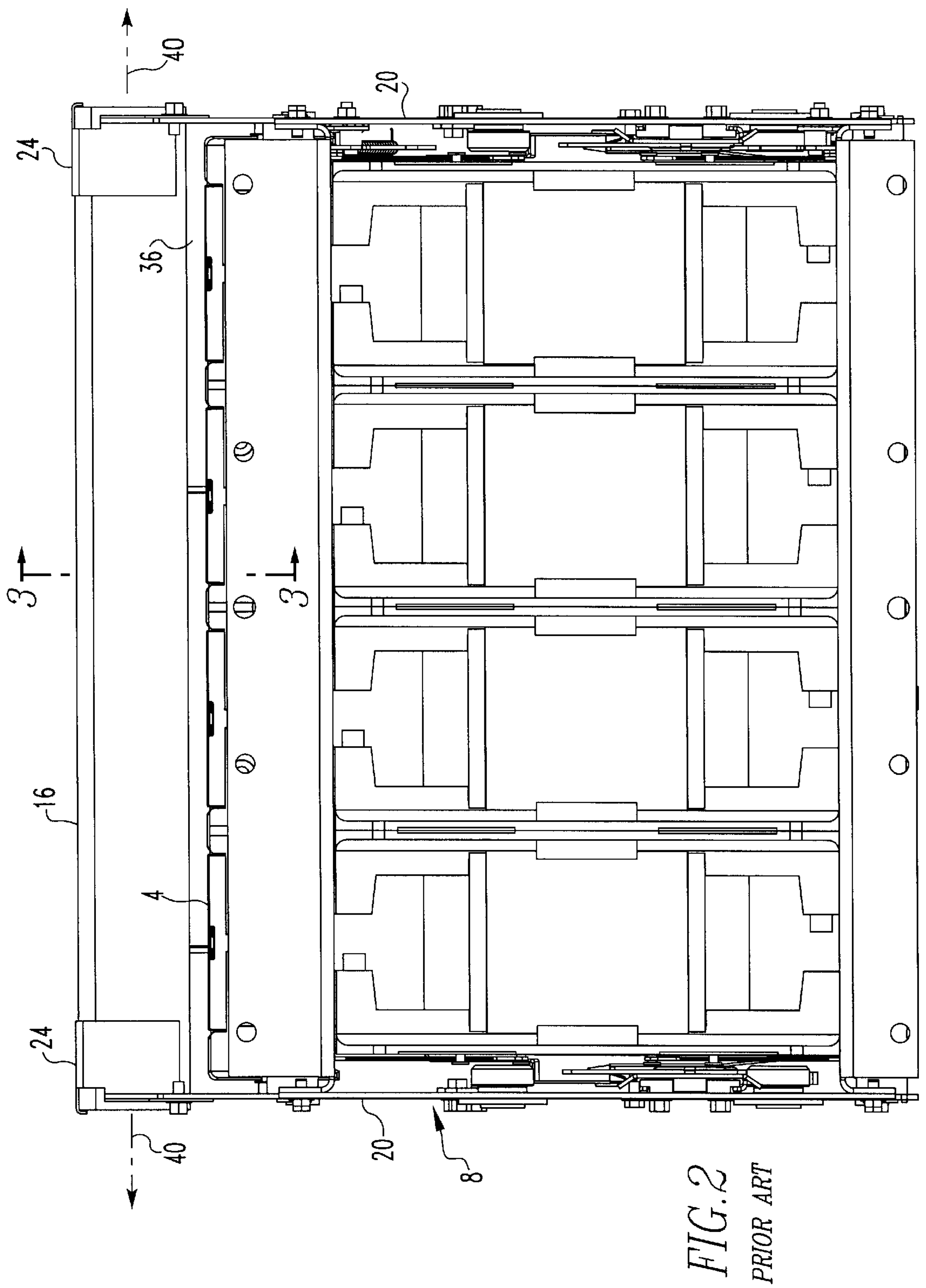
FIG. 2 PRIOR ART
FIG. 2 is a rear elevational view of the prior art cassette and circuit breaker.
Figure 3:
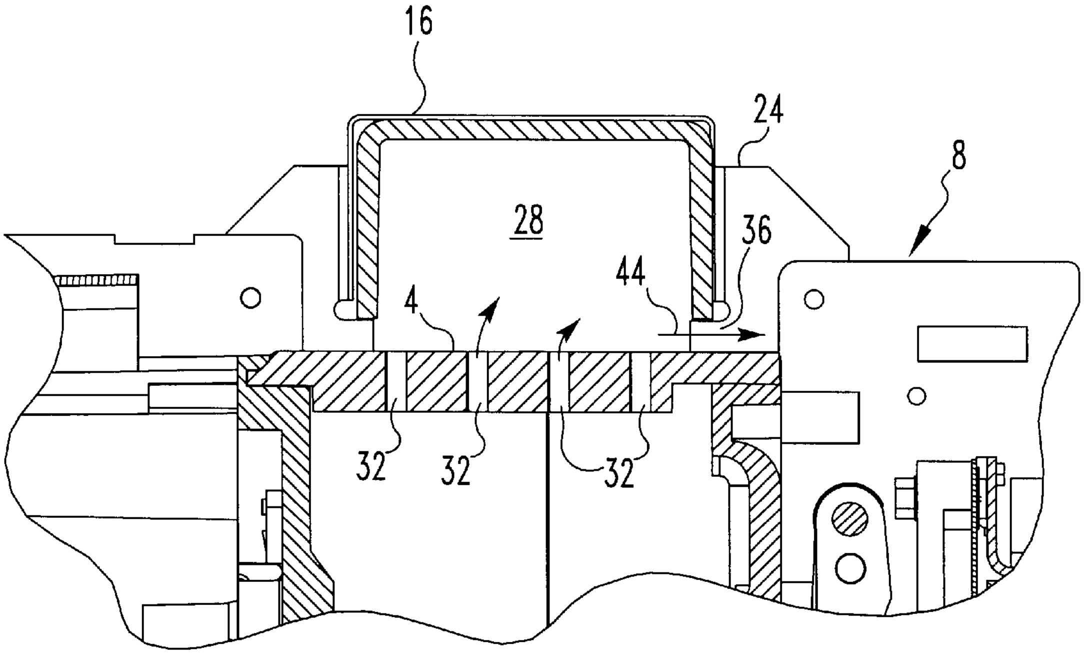
FIG. 3 PRIOR ART
FIG. 3 is a sectional view as taken along line 3—3 of FIG. 2.

FIGS. 2 and 3 indicate generally how the arc hood 16 is disposed above and spaced from the upper surface of the circuit breaker 4. FIGS. 2 and 3 also indicates that the arc hood 16 and circuit breaker 4 are vertically spaced from one another such that a gap 36 extends between the circuit breaker 4 and the arc hood 16. The gap 36 is sized to provide clearance for racking and unracking the circuit breaker 4 with respect to the cassette 8.

As is understood in the relevant art, in the event of a short circuit or other appropriate condition, the movable contacts of the circuit breaker 4 separate from stationary contacts thereof, and an arc is resultingly generated between the separating contacts. It is desirable to extinguish the arc as soon as possible, but during its short duration the arc nevertheless generates arc gases that are highly pressurized and highly ionized.

The circuit breaker 4 is configured with a plurality of vents 32 (FIG. 5) at the upper end thereof through which the arc gases are discharged. The arc gases are preferably discharged out of the immediate vicinity of the circuit breaker 4 to avoid direct contact between the highly-ionized arc gases and the line contacts 33 (FIG. 5) at the rear of the circuit breaker 4. The arc hood 16 with its flow channel 28 is thus provided to direct the arc gases flowing out of the vents 32 in a discharge direction 40 (FIG. 2) and toward various regions of the switchgear cabinet where the arc gases can cool and become deionized.

As indicated hereinbefore, however, the arc gases are also highly pressurized. As such, least a nominal portion of the arc gases undesirably flows or leaks through the gap 36 in a leakage direction 44 (FIG. 3).

A seal apparatus 100 in accordance with the present invention is indicated generally in FIGS. 4–8. The seal apparatus 100 advantageously resists the flow of arc gases in the leakage direction 44. The seal apparatus can either be retrofitted onto the prior art cassette 8 to provide an improved cassette 108 (FIGS. 5–8), or the improved cassette 108 can be originally manufactured to include the seal apparatus.

The seal apparatus 100 includes a generally planar seal member 102 and a plurality of fasteners 106. The seal member 102 is a flexible strap that is manufactured out of an elostomeric material or other appropriate material that is suited to withstand the high temperatures and high pressures of the exhaust gases that are produced by the circuit breaker 4. It is also preferred that the material out of which the seal member 102 is manufactured be non-conductive, however in certain applications a conductive material potentially may be appropriate depending upon the specific needs of the particular application.

Figure 4:
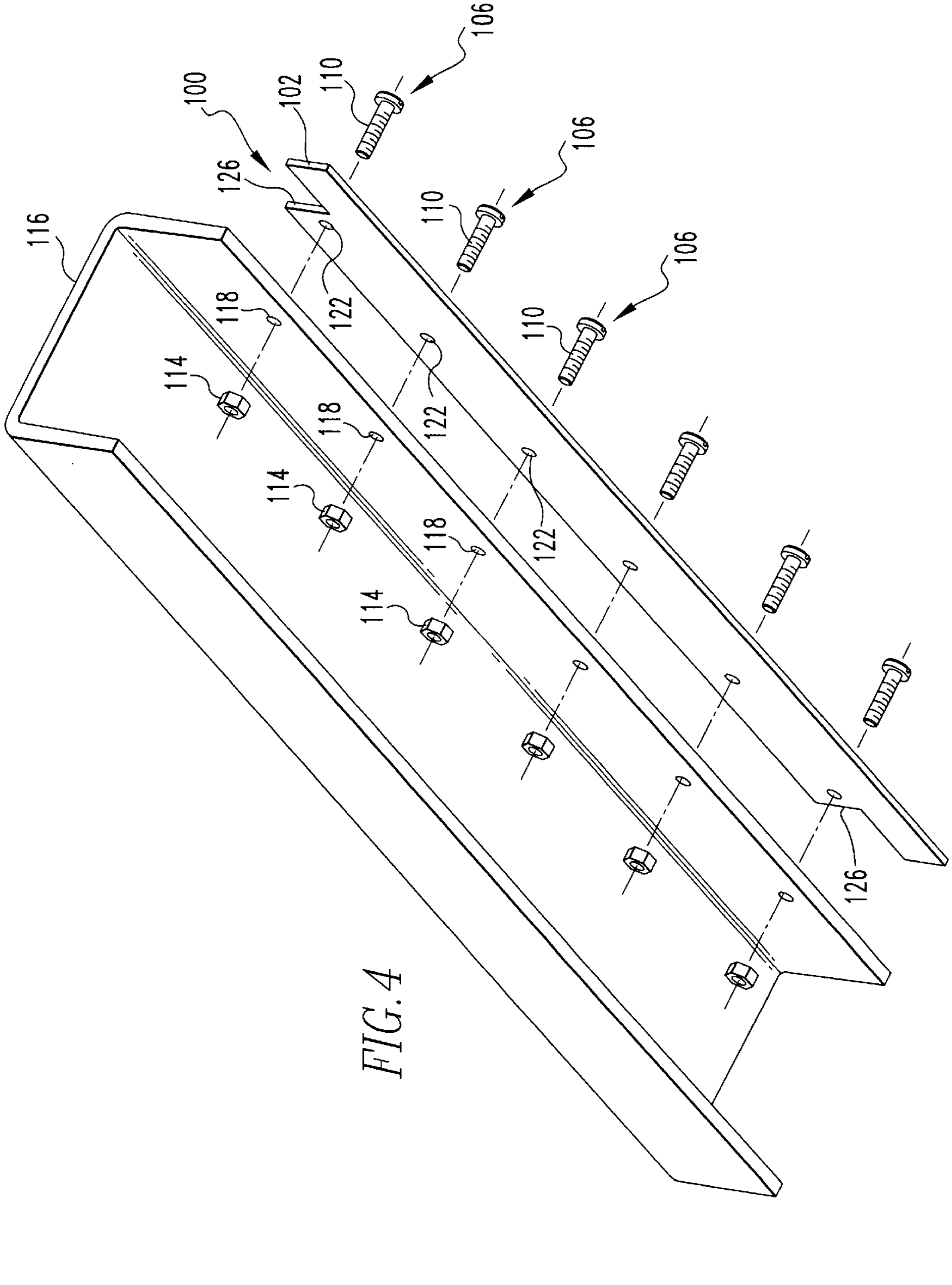
FIG. 4 is an exploded perspective view from below of a seal apparatus in accordance with the present invention and an arc hood.

The fasteners 106, as depicted in FIG. 4, are attachment devices that each include a bolt 110 and a nut 114 that are threadably or otherwise connectable with one another. The bolt 110 and nut 114 preferably are manufactured out of a nonconductive material such as nylon or other appropriate material that is suited to withstand the elevated temperatures and pressures of the arc gases emanating from the circuit breaker 4. It is understood, however, that the bolt 110 and nut 114 may be manufactured out of a conductive material depending upon the particular needs of the specific application. It is further understood that the fasteners 106 may be of other appropriate configuration, such as in the form screws, rivets, one or more welds, and the like without departing from the concept of the present invention.

As is best shown in FIG. 4, the seal apparatus 100 is mounted on an improved arc hood 116 that is similar to the prior art arc hood 16, except that the arc hood 116 is formed with a plurality of mounting holes 118. The mounting holes 118 can either be formed into the prior art arc hood 16 by the known methods such as drilling in a retrofitting application, or can be formed into the arc hood 116 during initial manufacture of the improved cassette 108. The seal member 102 is formed with a plurality of attachment holes 122 that correspond with the mounting holes 118 in the arc hood 116.

The threaded shanks of the bolts 110 are received first though the attachment holes 122 and then through the mounting holes 118 and protrude into the flow channel 128 (FIG. 8) of the arc hood 116. The nuts 114 are then threadably received on the threaded shanks of the bolts 110 to securely retain the seal member 102 on the arc hood 116. In this regard, it is understood that the seal member 102 can be mounted on the arc hood 116 in other fashions, such as with the use of adhesives, such as by applying one or more welds between the seal member 102 and the arc hood 116, and such as by mounting the seal member 102 within a groove on the arc hood 116 or vice-versa. It can also be seen that in other embodiments the seal member 102 potentially can be formed integrally with the improved arc hood 116 as a single monolithic member.

Figure 5:
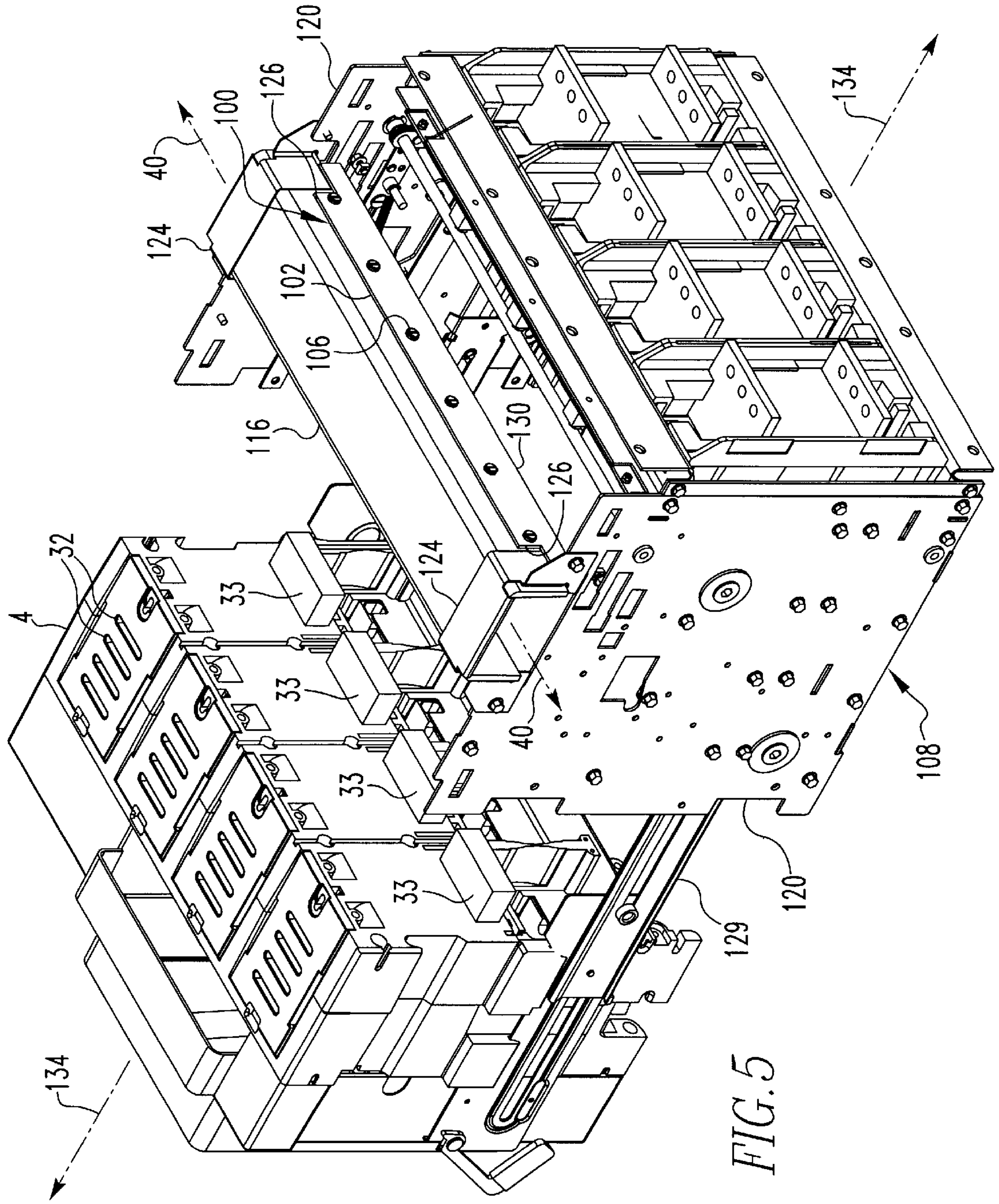
FIG. 5 is a perspective view of a portion of an improved cassette incorporating the present invention with a circuit breaker in an unracked position.
Figure 6:
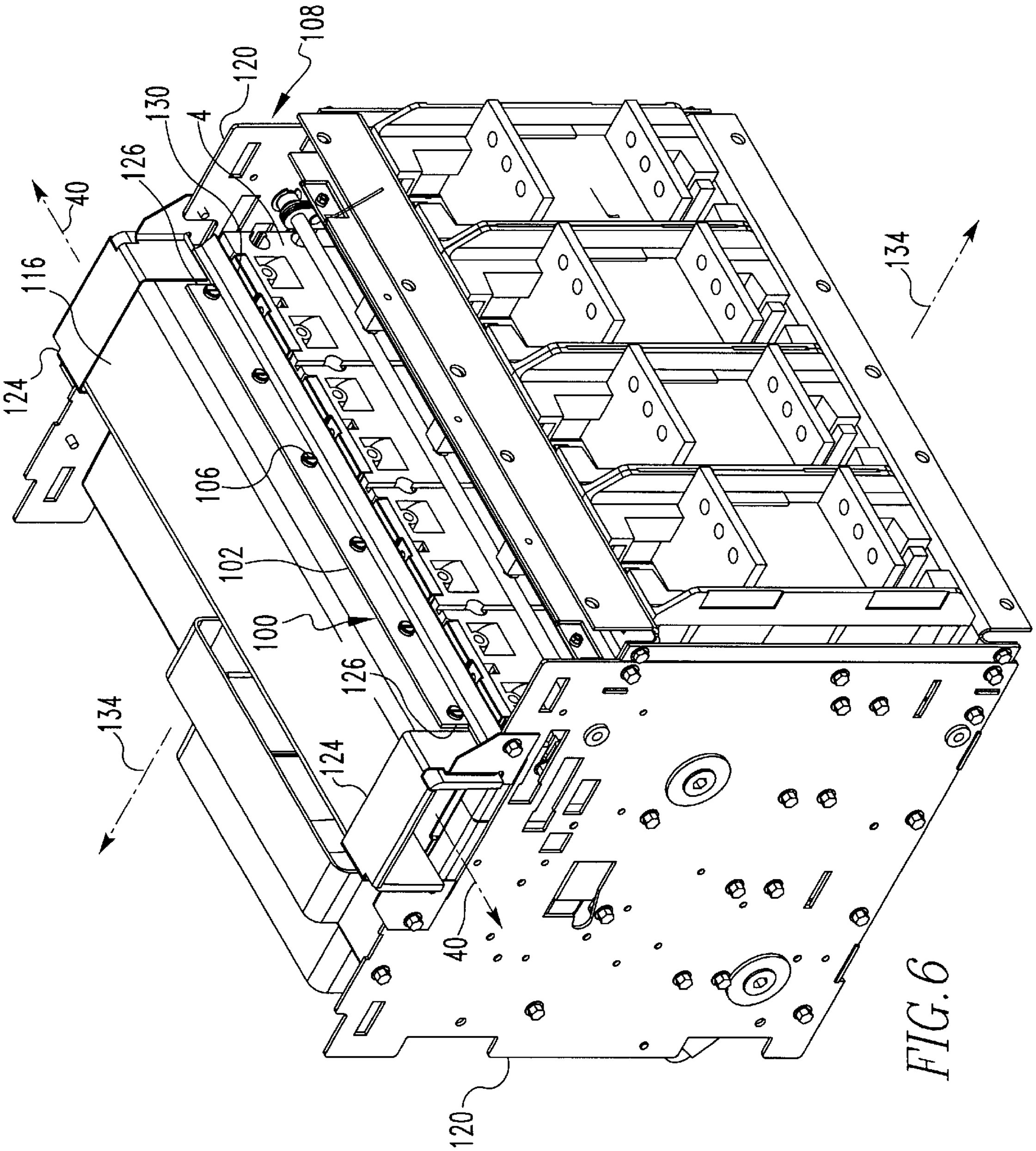
FIG. 6 is a view similar to FIG. 5, except showing the circuit breaker in a racked position.

In installing the arc hood 116 with the seal apparatus 100 onto the cassette 8 to form the improved cassette 108, the circuit breaker 4 is first slidably moved from the racked position indicated generally in FIGS. 1–3 to an unracked position indicated generally in FIG. 5. As is understood in the relevant art, the circuit breaker 4 is mounted on a pair of sliding rails 129 that permit the circuit breaker 4 to be slidably moved along a longitudinal axis 134 between the unracked and racked positions. With the circuit breaker 4 in the unracked position, the arc hood 116 carrying the seal apparatus 100 is mounted onto the spaced sidewalls 120 the improved cassette 108 with the brackets 124.

As can be seen in FIGS. 4–7, each end of the seal member 102 is formed with a rectangular cutout 126. The cutouts 126 avoid interference between the seal member 102 and the brackets 124 for purposes to be set forth more fully below. It can also be understood from FIGS. 4 and 5 that a protruding portion 130 of the seal member 102 protrudes downwardly from the lower edge of the arc hood 116 for purposes to be set forth more fully below. In this regard, one side of the seal member 102 is attached to the improved arc hood 116 with the fasteners 106, and the opposite side, i.e., the protruding portion 130, protrudes and extends from the arc hood 116.

Figure 8:
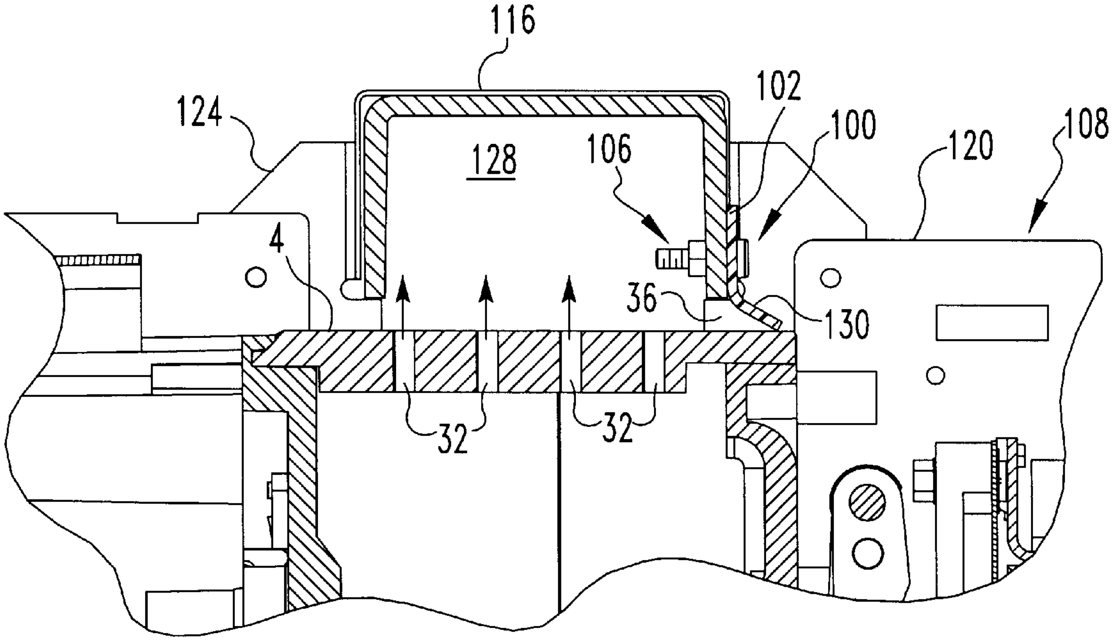
FIG. 8 is a sectional view as taken along line 8—8 of FIG. 7.

With the arc hood 116 mounted on the improved cassette 108 as set forth above, the circuit breaker 4 is then translated from the unracked position (FIG. 5) to the racked position (FIG. 6) such that the upper surface of the circuit breaker 4 engages and at least nominally deflects the protruding portion 130 of the seal member 102 (FIG. 8). The engagement of the circuit breaker 4 against the protruding portion 130 of the seal member 102 causes the seal member 102 to operationally extend between and span across at least a portion of the gap 36 between the arc hood 116 and the circuit breaker 4. In this regard, it can be seen that the protruding portion 130 preferably protrudes at least the length of the gap 36. The advantageous engagement of the protruding portion 130 with the circuit breaker 4 provides a sealing contact between the seal member 102 and the circuit breaker 4 along substantially the length of the seal member 102.

It can further be seen, therefore, that the cutouts 126 formed in the opposite ends of the seal member 102 avoid interference between the seal member 102 and the brackets 124 that mount the arc hood 116 onto the improved cassette 108. The avoidance of such interference both facilitates installation of the arc hood 116 onto the improved cassette 108 without a need for modifying the brackets 124, and moreover avoids contact between the seal member 102 and the brackets 124. The brackets 124 are out of contact with the seal member 102 and thus do not inhibit deflection of the protruding portion 130 by the circuit breaker 4 when the circuit breaker 4 is moved into the racked position. The seal member 102 is thus configured to be implemented in the improved cassette 108 with at most only minimal modification thereto and without impairing the performance of the seal member 102.

With the seal member 102 received against the circuit breaker 4 in the racked position and extending across the gap 36, it can be seen from FIG. 8 that the seal member 102 resists the flow of arc gases in the leakage direction 44 as otherwise had been depicted in FIG. 3 in connection with the prior art cassette 8. By resisting the arc gases from flowing in the leakage direction 44, the arc gases are advantageously resisted from flowing to the rearmost portions of the circuit breaker 4 and into the region of the line contacts 33 prior to being at least somewhat cooled, deionized, and slowed.

It has been discovered that by incorporating the seal apparatus 100 of the present invention into the prior art cassette 8 to produce the improved cassette 108, the circuit breaker 4 can be operated at voltages at least as high as 1100 volts. Prior to implementation of the seal apparatus 100, the circuit breaker 4 in the prior art cassette 8 could be operated at voltages no higher than 690 volts due to arcing at higher voltages between adjacent line conductors 33 during current interruption conditions.

The seal apparatus 100 mounted on the improved arc hood 116 thus permits the circuit breaker 4, which had previously been operable at voltages no higher than 690 volts, to be operated at much higher voltages inasmuch as the arc gases are resisted from flowing directly into the vicinity of the line conductors 33 (FIG. 5) at the rear of the circuit breaker 4 until the arc gases have at least nominally cooled, deionized, and slowed. As is understood in the relevant art, and as has been set forth above, direct contact between the highly ionized and heated arc gases and the line conductors 33 of the circuit breaker 4 can undesirably result in arcing between adjacent line conductors 33. The seal apparatus 100 of the present invention advantageously avoids such a situation, and thus permits the circuit breaker 4 to be operated at substantially higher voltages, by resisting the arc gases from leaking through the gap 36 between the circuit breaker 4 and the arc hood 116. In so doing, the seal apparatus 100 resists the arc gases from coming into contact with the line conductors 33 until the arc gases have cooled, deionzied, and/or slowed sufficiently that the arc gases do not meaningfully promote arcing between adjacent line conductors 33.

Figure 7:
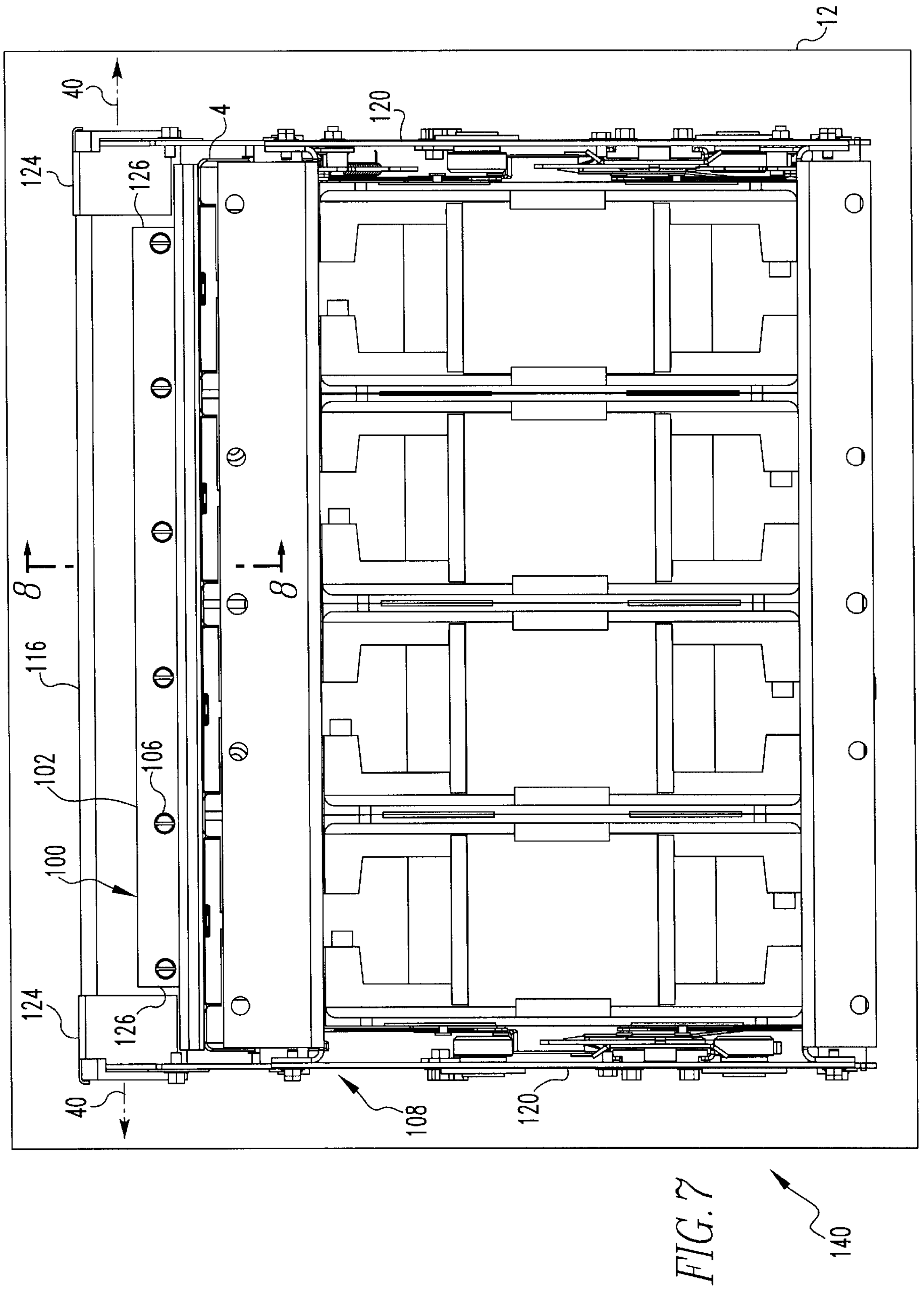
FIG. 7 is a rear elevational view of the improved cassette and circuit breaker mounted in a schematically-depicted improved switchgear cabinet.

FIG. 7 schematically depicts a switchgear cabinet 12 within which the improved cassette 108 and the circuit breaker 4 are disposed. It is understood that the switchgear cabinet 12 most typically would include a plurality of the improved cassettes 108, with each improved cassette 108 being a part of the switchgear cabinet 12. Each of the improved cassettes 108 also carries a circuit breaker 4. As indicated hereinbefore, the switchgear cabinet 12 having at least one improved cassette 108 including the seal apparatus 100 of the present invention and carrying a circuit breaker 4 provides an improved power distribution system 140 that can be operated at higher voltages than a similar power distribution system without the seal apparatus 100.

It is further understood that different configurations of the seal apparatus 100 can be employed depending upon the particular characteristics of the circuit breaker 4 and the cassette 8 into which the circuit breaker 4 is mounted. For instance, some cassettes are of a "double-wide" configuration whereby a pair of circuit breakers 4 are mounted side-by-side and connected with one another by a joining member. The seal apparatus 100 in such an application would be longer than that depicted herein. Alternatively, the seal apparatus can be configured to be mounted on the circuit breaker 4 instead of, or in addition to, the arc hood 116 depending upon the particular needs of the specific application.

From the foregoing, it can be seen that the seal member 102 mounted on the improved arc hood 116 extends in a direction generally parallel with the discharge direction 40. It can also be seen that the seal member 102 extends in a direction generally perpendicular to the leakage direction 44 of the prior art cassette 8. Inasmuch as the arc hood 116 and the seal member 102 extend in a direction substantially perpendicular with the longitudinal axis 134, it can be seen that the leakage direction 44 is in a direction generally parallel with the longitudinal axis 134, and that the seal member 102 resists leakage of the arc gases in a direction generally parallel with the longitudinal axis 134.

While a particular embodiment of the present invention has been described herein, it is understood that various changes, additions, modifications, and adaptations may be made without departing from the scope of the present invention, as set forth in the following claims.

What is claimed is:

1. A power distribution system comprising:

a switchgear cabinet having an arc hood;

a circuit breaker movably carried on the switchgear cabinet, the circuit breaker being movable along a longitudinal axis between a racked position and an unracked position; and a seal apparatus mounted on one of the circuit breaker and the switchgear cabinet;

the arc hood being disposed at least partially adjacent the circuit breaker when the circuit breaker is in the racked position, the arc hood being structured to direct arc gases discharged by the circuit breaker in a discharge direction;

the seal apparatus sealingly extending between at least a portion of the arc hood and at least a portion of the circuit breaker when the circuit breaker is in the racked position, the seal apparatus being structured to resist the flow of arc gases in a leakage direction.

2. The power distribution system as set forth in claim 1, in which the seal apparatus is mounted on the switchgear cabinet.

3. The power distribution system as set forth in claim 2, in which the seal apparatus is mounted on the arc hood.

4. The power distribution system as set forth in claim 1, in which the seal apparatus includes a seal member and a fastener.

5. The power distribution system as set forth in claim 4, in which the seal member is a flexible strap, the seal member being structured to be deflected by the circuit breaker in the racked position to form a tight seal against the circuit breaker.

6. The power distribution system as set forth in claim 5, in which the switchgear cabinet includes a bracket, the arc hood being carried on the bracket, and in which the seal member is formed with a cutout, the cutout being structured to avoid interference between the seal member and the bracket during deflection of the seal member.

7. The power distribution system as set forth in claim 1, in which the arc hood extends in a direction substantially transverse to the longitudinal axis.

8. The power distribution system as set forth in claim 7, in which the arc hood extends over at least a portion of a plurality of vents formed in the circuit breaker when the circuit breaker is in the racked position.

9. The power distribution system as set forth in claim 1, in which a gap exists between the circuit breaker and the arc hood when the circuit breaker is in the racked position, the seal apparatus sealingly extending along at least a portion of the gap.

10. The power distribution system as set forth in claim 9, in which the seal apparatus includes a flexible strap having a protruding portion that extends from the arc hood, the flexible strap being connected to the arc hood along a side of the flexible strap opposite the protruding portion, the protruding portion being at least the length of the gap.

11. A seal apparatus for resisting the flow of arc gases through a gap between a circuit breaker and an arc hood in a switchgear cabinet, the seal apparatus comprising a seal member mounted on one of the arc hood and the circuit breaker and structured to sealingly extend along at least a portion of the gap between the arc hood and the circuit breaker.

12. The seal apparatus as set forth in claim 11, in which the seal apparatus includes an attachment device, the attachment device being structured to mount the seal member on one of the arc hood and the circuit breaker.

13. The seal apparatus as set forth in claim 12, in which the attachment device is a plurality of fasteners.

14. The seal apparatus as set forth in claim 13, in which each of the fasteners is threaded.

15. The seal apparatus as set forth in claim 11, in which the seal member is formed with a cutout.

16. The seal apparatus as set forth in claim 11, in which the seal member is flexible.

17. A method of resisting the flow of a quantity of arc gases through a gap between an arc hood mounted on a switchgear cabinet and a circuit breaker movably mounted on the cabinet, the method comprising the steps of:

mounting a seal apparatus on one of the switchgear cabinet and the circuit breaker; and sealingly spanning the seal apparatus across at least a portion of the gap.

18. The method as set forth in claim 17, in which the step of sealingly spanning the seal apparatus across at least a portion of the gap includes the steps of moving the circuit breaker from an unracked position to a racked position and receiving the seal apparatus against the other of the switchgear cabinet and the circuit breaker with the circuit breaker in the racked position.

19. The method as set forth in claim 18, in which the step of receiving the seal apparatus against the other of the switchgear cabinet and the circuit breaker includes the step of elastically deflecting a protruding portion of the seal apparatus with the other of the switchgear cabinet and the circuit breaker.

20. The method as set forth in claim 17, in which the step of mounting a seal apparatus on one of the switchgear cabinet and the circuit breaker includes the step of fastening a seal member to the arc hood with a fastener.

* * * * *